United States Patent
Lin (10) Patent No.: US 9,893,635 B2
(45) Date of Patent: Feb. 13, 2018

(54) ISOLATED SWITCHING CONVERTER WITH OPTOCOUPLER AND SECONDARY CONTROL CIRCUIT THEREOF

(71) Applicant: Chengdu Monolithic Power Systems Co., Ltd., Chengdu (CN)

(72) Inventor: Sicong Lin, Hangzhou (CN)

( * ) Notice: Subject to any disclaimer, the term of this patent is extended or adjusted under 35 U.S.C. 154(b) by 0 days.

(21) Appl. No.: 15/387,621

(22) Filed: Dec. 21, 2016

(65) Prior Publication Data

US 2017/0187298 A1    Jun. 29, 2017

(30) Foreign Application Priority Data

Dec. 29, 2015   (CN) .......................... 2015 1 1010635

(51) Int. Cl.

| | |
|---|---|
| *H02M 1/00* | (2006.01) |
| *H02M 3/335* | (2006.01) |
| *H02M 1/08* | (2006.01) |
| *H02M 1/32* | (2007.01) |
| *H02M 3/337* | (2006.01) |

(52) U.S. Cl.
CPC ......... *H02M 3/33553* (2013.01); *H02M 1/08* (2013.01); *H02M 1/32* (2013.01); *H02M 3/3376* (2013.01); *H02M 3/33523* (2013.01); *H02M 2001/0009* (2013.01); *H02M 2001/0048* (2013.01); *H02M 2001/0058* (2013.01)

(58) Field of Classification Search
CPC . H02M 2001/0009; H02M 2001/0048; H02M 2001/32
See application file for complete search history.

(56) References Cited

U.S. PATENT DOCUMENTS

| | | | | |
|---|---|---|---|---|
| 5,446,348 A | * | 8/1995 | Michalek ................ | F02P 7/035 315/209 CD |
| 9,774,253 B2 | * | 9/2017 | Xu ......................... | H02M 3/156 |
| 2006/0268586 A1 | * | 11/2006 | Mikulenka ........ | H02M 3/33561 363/21.14 |
| 2010/0321956 A1 | * | 12/2010 | Yeh .................... | H02M 3/33507 363/16 |
| 2011/0169426 A1 | * | 7/2011 | Sadwick ............ | H05B 41/2824 315/307 |
| 2013/0301311 A1 | * | 11/2013 | Wang ................ | H02M 3/33515 363/21.13 |

(Continued)

*Primary Examiner* — Jeffrey Gblende
*Assistant Examiner* — David A. Singh
(74) *Attorney, Agent, or Firm* — Perkins Coie LLP (57) ABSTRACT

An isolated switching converter includes a transformer, a primary circuit, a rectifying circuit and an optocoupler with a photo-sensitive device and a light emitting device, wherein the light emitting device has a first terminal coupled to an output voltage of the switching converter. A method for controlling the switching converter includes: sensing the output voltage and generating a voltage feedback signal; generating an error amplifying signal based on a reference signal and the voltage feedback signal, and providing the error amplifying signal to a second terminal of the light emitting device; disconnecting the error amplifying signal from the second terminal of the light emitting device if the error amplifying signal becomes lower than a first threshold voltage; and reconnecting the error amplifying signal to the second terminal of the light emitting device when the voltage reference signal becomes lower than a second threshold voltage.

10 Claims, 8 Drawing Sheets

(56) References Cited

U.S. PATENT DOCUMENTS

| | | | |
|---|---|---|---|
| 2014/0016373 A1* | 1/2014 | Zhang | H02M 3/33523 363/21.15 |
| 2014/0091720 A1* | 4/2014 | Brinlee | H05B 33/0815 315/186 |
| 2014/0254213 A1* | 9/2014 | Matthews | H02M 3/33523 363/21.15 |
| 2015/0103567 A1* | 4/2015 | Wang | H02M 3/33592 363/21.13 |
| 2015/0103569 A1* | 4/2015 | Zhang | H02M 3/33507 363/21.16 |
| 2015/0189710 A1* | 7/2015 | Lin | H05B 33/0818 315/224 |
| 2016/0233779 A1* | 8/2016 | Cohen | H02M 3/33592 |
| 2016/0261198 A1* | 9/2016 | Li | H02M 1/15 |

\* cited by examiner

Fig. 1

(PRIOR ART)

ISOLATED SWITCHING CONVERTER WITH OPTOCOUPLER AND SECONDARY CONTROL CIRCUIT THEREOF

CROSS-REFERENCE TO RELATED APPLICATIONS

This application claims the benefit of CN application 201511010635.0, filed on Dec. 29, 2015, and incorporated herein by reference.

TECHNICAL FIELD

The present invention generally relates to electronic circuits, and more particularly but not exclusively to isolated switching converters.

BACKGROUND

Figure 1:
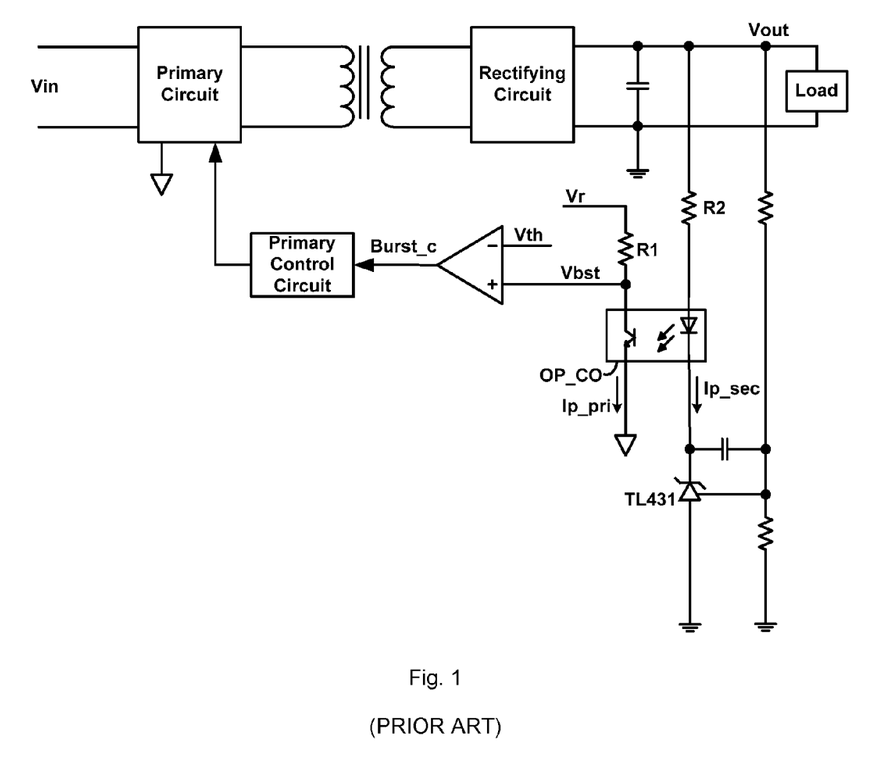
FIG. 1 illustrates a traditional isolated switching converter using a shunt regulator TL431.

For traditional isolated switching converters as shown in FIG. 1, an optocoupler OP_CO and an adjustable shunt regulator TL431 are commonly utilized to feedback the output status to the primary side, so as to regulate the output voltage Vout. The light emitting device in the optocoupler OP_CO has one terminal coupled to the output voltage Vout through the resistor R2, and another terminal coupled to the secondary reference ground through the shunt regulator TL431. The photo-sensitive device in the optocoupler OP_CO has one terminal coupled to a voltage Vr (e.g. 2V), and another terminal coupled to the primary reference ground. When load becomes lighter, the output voltage Vout goes up. The current Ip_sec, Ip_pri respectively flowing through the light emitting device and the photo-sensitive device both increases, and the voltage Vbst at the common node of the photo-sensitive device and the resistor R1 falls. If the voltage Vbst decreases to be lower than a threshold voltage Vth (e.g. 1.25V), the switching converter will enter into a burst mode to reduce switching loss.

Nevertheless, since the current Ip_sec and Ip_pri both become larger when the load goes lighter, more power loss is generated, which causes an adverse impact on light load efficiency and no load efficiency of the switching converter.

SUMMARY

Embodiments of the present invention are directed to a control method used in an isolated switching converter, wherein the switching converter includes a transformer with a primary winding and a secondary winding, a primary circuit coupled to the primary winding, a rectifying circuit coupled to the secondary winding, and an optocoupler with a photo-sensitive device and a light emitting device. The light emitting device has a first terminal coupled to an output voltage of the switching converter. The control method comprises: sensing the output voltage and generating a voltage feedback signal; generating an error amplifying signal based on a reference signal and the voltage feedback signal, and providing the error amplifying signal to a second terminal of the light emitting device; comparing the error amplifying signal with a first threshold voltage; disconnecting the error amplifying signal from the second terminal of the light emitting device if the error amplifying signal becomes lower than the first threshold voltage; comparing the voltage feedback signal with a second threshold voltage; and reconnecting the error amplifying signal to the second terminal of the light emitting device when the voltage reference signal becomes lower than the second threshold voltage.

Embodiments of the present invention are also directed to a control method used in an isolated switching converter. The switching converter includes a transformer with a primary winding and a secondary winding, a primary circuit coupled to the primary winding, a rectifying circuit coupled to the secondary winding, and an optocoupler with a photo-sensitive device and a light emitting device. The control method comprises: determining whether the switching converter works in a light load condition based on an output voltage of the switching converter; setting the current flowing through the light emitting device to zero if the light load condition has been detected; determining whether the current flowing through the photo-sensitive device is zero; and stopping the primary circuit from providing energy to the rectifying circuit if the current flowing through the photo-sensitive device is detected to be zero.

Embodiments of the present invention are further directed to a secondary control circuit used in an isolated converter, wherein the switching converter includes a transformer with a primary winding and a secondary winding, a primary circuit coupled to the primary winding, a rectifying circuit coupled to the secondary winding, and an optocoupler with a photo-sensitive device and a light emitting device. The light emitting device has a first terminal coupled to an output voltage of the switching converter. The secondary control circuit comprises: an error amplifier having a first input terminal, a second input terminal and an output terminal, wherein the first input terminal is configured to receive a reference signal, the second input terminal is configured to receive a voltage feedback signal indicative of the output voltage, and wherein based on the reference signal and the voltage feedback signal, the error amplifier generates an error amplifying signal at the output terminal; a transistor having a first terminal, a second terminal and a control terminal, wherein the first terminal is coupled to a second terminal of the light emitting device, the second terminal is coupled to the output terminal of the error amplifier; a first comparator having a first input terminal, a second input terminal and an output terminal, wherein the first input terminal is configured to receive a first threshold voltage, the second input terminal is coupled to the output terminal of the error amplifier, and wherein the first comparator compares the error amplifying signal with the first threshold voltage and generates a first comparison signal at the output terminal; a second comparator having a first input terminal, a second input terminal and an output terminal, wherein the first input terminal is configured to receive a second threshold voltage, the second input terminal is configured to receive the voltage feedback signal, and wherein the second comparator compares the voltage feedback signal with the second threshold voltage and generates a second comparison signal at the output terminal; and a logic circuit having a first input terminal, a second input terminal and an output terminal, wherein the first input terminal is coupled to the output terminal of the first comparator, the second input terminal is coupled to the output terminal of the second comparator, the output terminal is coupled to the control terminal of the transistor, and wherein based on the first and second comparison signals, the logic circuit generates a switch control signal at the output terminal.

In embodiments of the present invention, a secondary control circuit is utilized instead of TL431. Having detected a light load condition based on the output voltage, this secondary control circuit sets the current flowing through the light emitting device to zero until the output voltage falls to a certain value. If a zero current of the photo-sensitive device is detected, the primary circuit will stop providing energy to the secondary side. Otherwise, the switching frequency or duty cycle of the primary circuit will be adjusted according to the current flowing through the photo-sensitive device, so as to regulate the output voltage. Since the current flowing through the light emitting device and the photo-sensitive device are both zero over quite a long time, the light load efficiency and no load efficiency of the switching converter are improved.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 2:
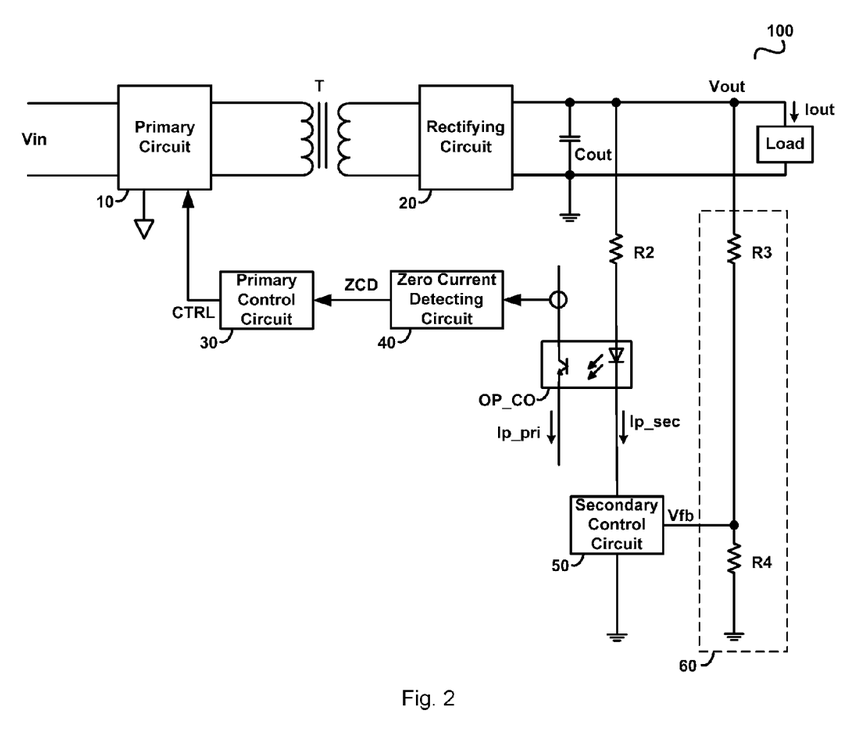
FIG. 2 is a block diagram of an isolated switching converter 100 in accordance with an embodiment of the present invention.

FIG. 2 is a block diagram of an isolated switching converter 100 in accordance with an embodiment of the present invention. This switching converter 100 includes a transformer T, an optocoupler OP_CO, an output capacitor Cout, a primary circuit 10, a rectifying circuit 20, a primary control circuit 30, a zero current detecting circuit 40, a secondary control circuit 50 and a voltage feedback circuit 60. The transformer T has a primary winding and a secondary winding. The primary circuit 10 has an input terminal configured to receive an input voltage Vin, and an output terminal coupled to the primary winding of the transformer T. The rectifying circuit 20 has an input terminal coupled to the secondary winding, and an output terminal providing an output voltage Vout to a load. The isolated switching converter 100 could be configured in any of Forward converter, Flyback converter and LLC resonant converter, etc. And the rectifying circuit 20 contained therein might be full-wave or half-wave rectifier.

The optocoupler OP_CO has a photo-sensitive device at the primary side and a light emitting device at the secondary side. The light emitting device has a first terminal coupled to the output voltage Vout, for example, through a resistor R2. A voltage feedback circuit 60 is coupled to the output terminal of the rectifying circuit 20, and is configured to generate a voltage feedback signal Vfb indicative of the output voltage Vout. As shown in FIG. 2, a resistor divider consisting of resistors R3 and R4 is utilized as the voltage feedback circuit 60. The secondary control circuit 50 is coupled to the second terminal of the light emitting device and the voltage feedback circuit 60, and is configured to adjust the current Ip_sec flowing through the light emitting device based on the voltage feedback signal Vfb. Specifically, if the secondary control circuit 50 detects (for instance, based on the voltage feedback signal Vfb) that the switching converter 100 has fallen into a light load condition, which means the output current Iout has decreased to a certain level, it will set the current Ip_sec to zero (equal to zero or substantially equal to .zero). So the light load information could be transmitted to the primary side through the current Ip_pri of the photo-sensitive device, and get the switching converter 100 to enter into a burst mode.

The zero current detecting circuit 40 is coupled to the photo-sensitive device. It detects whether the current Ip_pri flowing through the photo-sensitive device is zero, and generates a zero current detection signal ZCD accordingly. The primary control circuit 30 is coupled zero current detecting circuit 40. Depending on the zero current detecting signal ZCD, the primary control circuit 30 generates a control signal CTRL to control the primary circuit 10. If a zero current of Ip_pri is detected, the primary circuit 10 will stop working. In other words, transistors in the primary circuit 10 will stop switching, thus energy will no longer be provided to the rectifying circuit 20. On the other hand, it the current Ip_pri is not zero, the primary control circuit 30 will adjust switching frequency or duty cycle of the transistors in the primary circuit 10 in accordance with the current Ip_pri, so as to realize regulation of the output voltage Vout.

With regard to the switching converter 100 shown in FIG. 2, the voltage feedback signal Vfb as well as the output voltage Vout goes up while the output current Iout decreases. In one embodiment, when the voltage feedback signal Vfb increases to a relatively high value, the switching converter is deemed as entering into a light load condition. The secondary control circuit 50 sets the current Ip_sec of the light emitting device to zero, which then induces the current Ip_pri of the photo-sensitive device to also become zero. After this zero current is detected by the zero current detecting circuit 40, the primary circuit 10 stops working under the control of the primary control circuit 30. The energy provided to the secondary side is ceased, and it is the output capacitor Cout which is responsible for supporting the load. Consequently, the output voltage Vout across the output capacitor Cout and the voltage feedback signal Vfb both decline. When the voltage feedback signal Vfb falls to a relatively low value, the secondary control circuit 50 will stop forcing the current Ip_sec to be zero, but make it larger than zero and adjustable with the output voltage Vout. Affected by the zero current detection signal ZCD, the primary circuit 10 resumes working and causes the output voltage Vout and the voltage feedback signal Vfb to increase. When the voltage feedback signal Vfb hits the relative high value, the current Ip_sec and Ip_pri will become zero again to let the primary circuit 10 stop working. These steps are repeated until the switching converter 100 leaves the light load condition.

Compared with the prior art shown in FIG. 1, the current Ip_sec and Ip_pri in the embodiment of FIG. 2 are both zero when the primary circuit 10 stops providing energy to the secondary side. Consequently, the light load efficiency, and especially the no load efficiency of the switching converter are highly improved.

Figure 3:
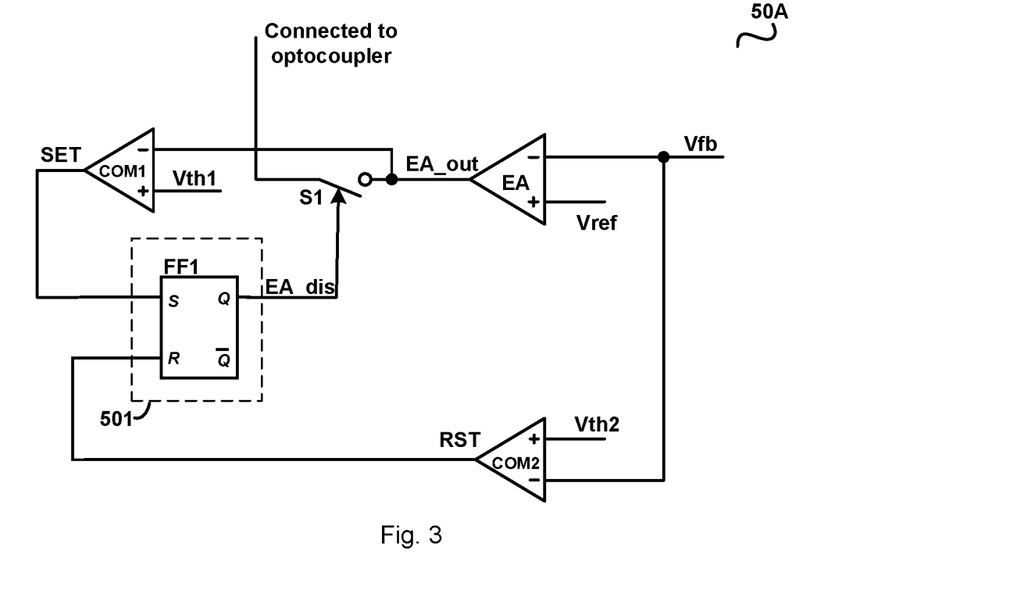
FIGS. 3~5 respectively schematically illustrate secondary control circuits 50A~50C in accordance with different embodiments of the present invention.

FIG. 3 illustrates a secondary control circuit 50A in accordance with embodiments of the present invention. The secondary control circuit 50A includes an error amplifier EA, a transistor S1, comparators COM1, COM2 and a logic circuit 501. The error amplifier EA has a non-inverting input terminal, an inverting input terminal and an output terminal, wherein the non-inverting input terminal is configured to receive a reference signal Vref, the inverting input terminal is configured to receive the voltage feedback signal Vfb. Based on the reference signal Vref and the voltage feedback signal Vfb, the error amplifier EA generates an error amplifying signal EA_out at the output terminal. The transistor S1 has a first terminal, a second terminal and a control terminal, wherein the first terminal is coupled to the second terminal of the light emitting device in the optocoupler OP_CO, the second terminal is coupled to the output terminal of the error amplifier EA. Generally, a compensation network consisting of capacitors and resistors is provided between the first terminal of the transistor S1 and the inverting input terminal of the error amplifier EA.

The comparator COM1 has a non-inverting input terminal, an inverting input terminal and an output terminal, wherein the non-inverting input terminal is configured to receive a threshold voltage Vth1, the inverting input terminal is coupled to the output terminal of the error amplifier EA. The comparator COM1 compares the error amplifying signal EA_out with the threshold voltage Vth1 and generates a comparison signal SET at the output terminal. The comparator COM2 also has a non-inverting input terminal, an inverting input terminal and an output terminal, wherein the non-inverting input terminal is configured to receive a threshold voltage Vth2, the inverting input terminal is configured to receive the voltage feedback signal Vfb. The comparator COM2 compares the voltage feedback signal Vfb with the threshold voltage Vth2 and generates a comparison signal RST at the output terminal. The logic circuit 501 has a first input terminal, a second input terminal and an output terminal, wherein the first input terminal is coupled to the output terminal of the comparator COM1, the second input terminal is coupled to the output terminal of the comparator COM2, the output terminal is coupled to the control terminal of the transistor S1. Based on the comparison signals SET and RST, the logic circuit 501 generates a switch control signal EA_dis at the output terminal.

In an embodiment, the logic circuit 501 includes a flip-flop FF1 with a set terminal S, a reset terminal R and an output terminal Q. The set terminal S of the flip-flop FF1 is coupled to the output terminal of the comparator COM1, the reset terminal R is coupled to the output terminal of the comparator COM2, and the output terminal Q is coupled to the control terminal of the transistor S1.

In normal operation, the error amplifying signal EA_out is higher than the threshold voltage Vth1. The switch control signal EA_dis maintains low, and the transistor S1 keeps on to continuously provide the error amplifying signal EA_out to the second terminal of the light emitting device. The current Ip_sec and Ip_pri both vary with the error amplifying signal EA_out. The primary control circuit therefore adjusts the switching frequency or duty cycle of the primary circuit in accordance with the current Ip_pri to regulate the output voltage Vout.

When the switching converter enters into the light load condition, the output voltage Vout increases, and the error amplifying signal EA_out falls to be lower than the threshold voltage Vth1. The flip-flop FF1 is set and the switch control signal EA_dis changes from logical low into logical high to turn off the transistor S1. The current Ip_sec and Ip_pri both become zero. Once this zero current of Ip_pri is detected by the zero current detecting circuit, the primary circuit stops providing energy to the secondary side and the output voltage Vout starts to decline. When the output voltage Vout falls to be lower than the threshold voltage Vth2 (e.g. 0.9*Vref), the flip-flop FF1 is reset. The switch control signal EA_dis changes from logical high into logical low to turn on the transistor S1. The error amplifying signal EA_out is reconnected to the second terminal of the light emitting device, and the current Ip_sec and Ip_pri both come to be larger than zero. The primary circuit restarts to work and gets the output voltage Vout to rise, until the error amplifying signal EA_out hits the threshold voltage Vth1 again. The above steps are reiterated, and thus construct the burst mode under light load condition.

Figure 4:
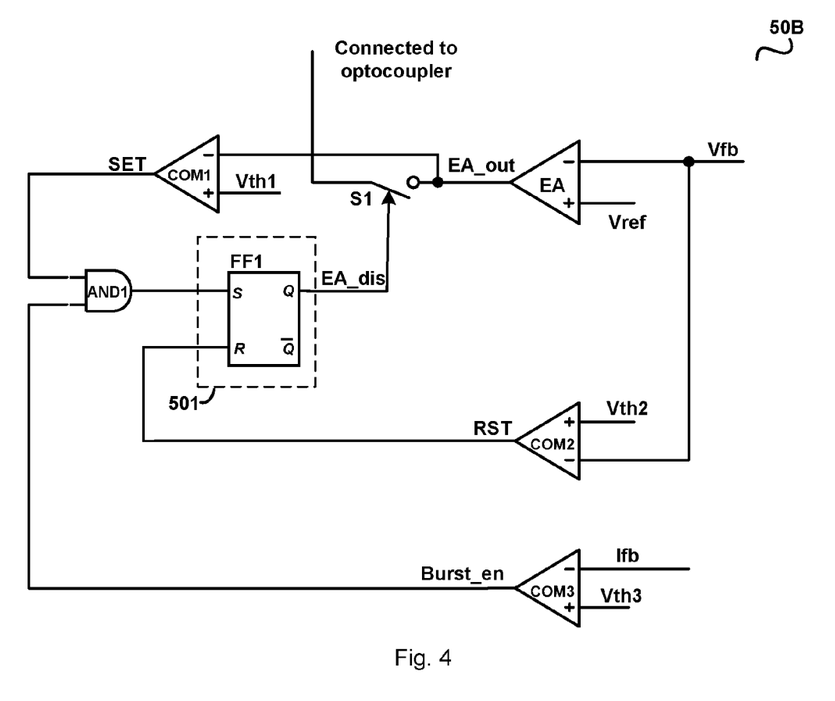

In practical applications, the load current when the switching converter enters into the burst mode is hard to be precisely controlled because of parameter tolerance. And audible noise will be generated if the switching converter enters into the burst mode when the load current is still relatively large. FIG. 4 illustrates a secondary control circuit 50B in accordance with embodiments of the present invention. Compared with the circuit shown in FIG. 3, the secondary control circuit 50B further incorporates a comparator COM3 and an AND gate AND1. The comparator COM3 has a non-inverting input terminal, an inverting input terminal and an output terminal, wherein the non-inverting input terminal is configured to receive a threshold voltage Vth3, the inverting input terminal is configured to receive a current feedback signal Ifb indicative of the output current Iout of the switching converter. The comparator COM3 compares the current feedback signal Ifb with the threshold voltage Vth3 and generates a comparison signal Burst_en at the output terminal. The AND gate AND1 has a first input terminal, a second input terminal and an output terminal, wherein the first input terminal is coupled to the output terminal of the comparator COM1, the second input terminal is the output terminal of the comparator COM3, and the output terminal is coupled to the first input terminal of the logic circuit 501.

With reference to the circuit shown in FIG. 4, the transistor S1 could be turned off by the comparison signal SET only if the current feedback signal Ifb is lower than the threshold voltage Vth3. By doing so, the switching converter would not enter into the burst mode at a high load current and audible noise is avoided.

Figure 5:
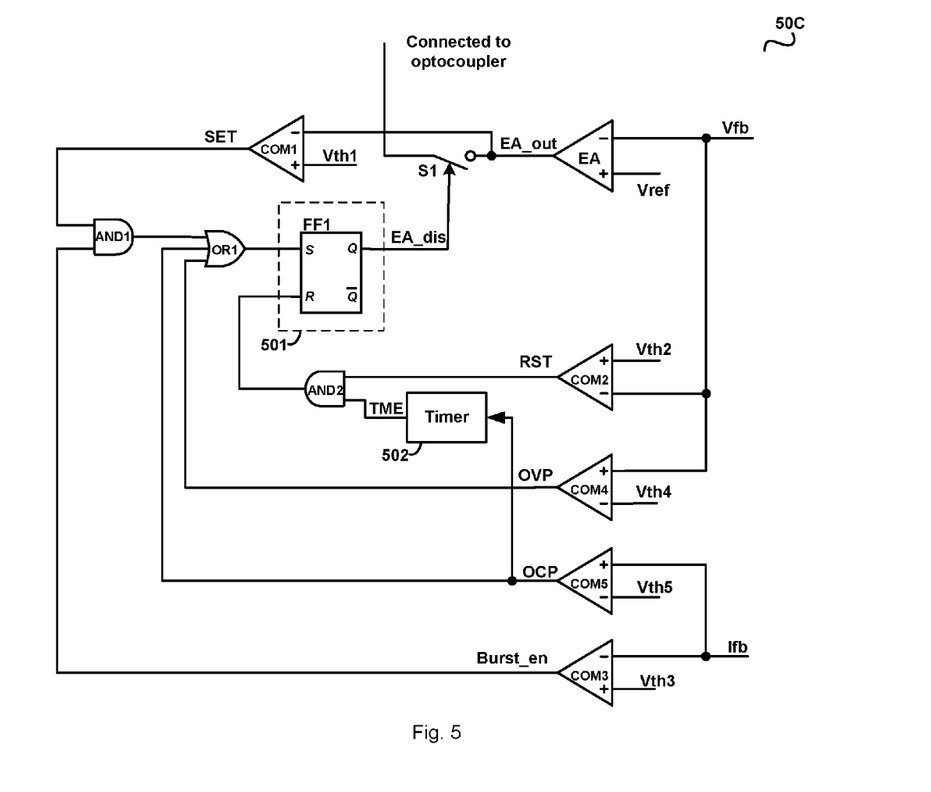

FIG. 5 illustrates a secondary control circuit 50C in accordance with embodiments of the present invention. Compared with the circuit shown in FIG. 4, the secondary control circuit 50C further incorporates over voltage protection and over current protection through comparators COM4, COM5, an AND gate AND2, an OR gate OR1 and a timer 502. The comparator COM4 has a non-inverting input terminal, an inverting input terminal and an output terminal, wherein the non-inverting input terminal is configured to receive the voltage feedback signal Vfb, the inverting input terminal is receive a threshold voltage Vth4.

The comparator COM4 compares the voltage feedback signal Vfb with the threshold voltage Vth4 and generates an over voltage protection signal OVP at the output terminal. The comparator COM5 has a non-inverting input terminal, an inverting input terminal and an output terminal, wherein the non-inverting input terminal is configured to receive the current feedback signal Ifb, the inverting input terminal is receive a threshold voltage Vth5. The comparator COM5 compares the current feedback signal Ifb with the threshold voltage Vth5 and generates an over current protection signal OCP at the output terminal.

The OR gate OR1 has a first input terminal, a second input terminal, a third terminal and an output terminal, wherein the first input terminal is coupled to the output terminal of the AND gate AND1, the second input terminal is coupled to the output terminal of the comparator COM4, the third input terminal is coupled to the output terminal of the comparator COM5, and the output terminal is coupled to the first input terminal of the logic circuit 501. The timer 502 has an input terminal and an output terminal, wherein the input terminal is coupled to the output terminal of the comparator COM5. The timer 502 measures time based on the over current protection signal OCP and generate a timing signal TME at the output terminal. The AND gate AND2 has a first input terminal, a second input terminal and an output terminal, wherein the first input terminal is coupled to the output terminal of the comparator COM2, the second input terminal is coupled to the output terminal of the timer 502, and the output terminal is coupled to the second input terminal of the logic circuit 501.

If an over voltage or over current condition has been detected, the secondary control circuit 50C will turn off the transistor S1 to stop the primary circuit from providing energy to the secondary side. With regard to over voltage protection, the transistor S1 is going to be turned back on as long as the voltage feedback signal Vfb decreases to be lower than the threshold voltage Vth2. But for over current protection, even if the voltage feedback signal Vfb has already decreased to be lower than the threshold voltage Vth2, the transistor cannot be turned back on unless the time measured by the timer 502 has reached a predetermined time threshold.

Figure 6:
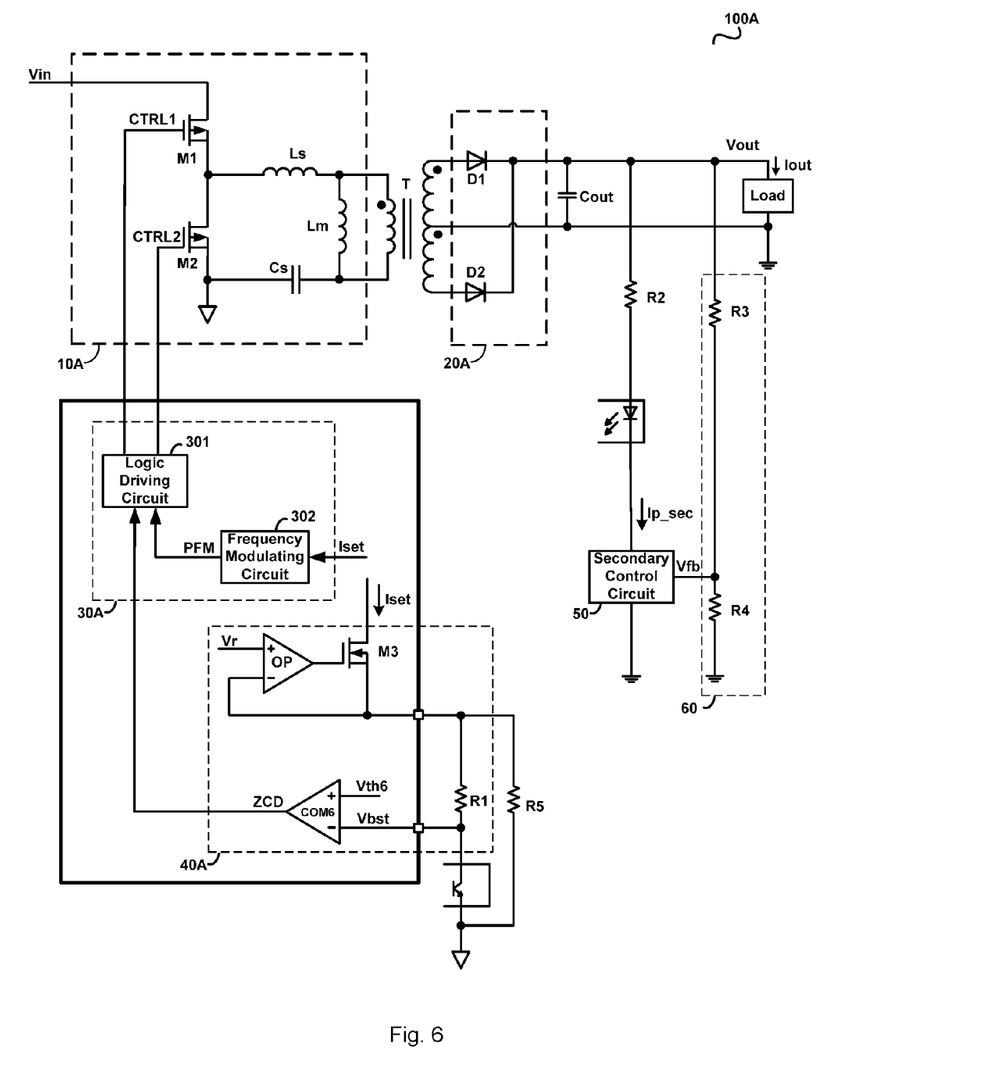
FIGS. 6 and 7 respectively are block diagrams of isolated switching converters 100A and 100B in accordance with embodiments of the present invention.

FIG. 6 is a block diagram of isolated switching converter 100A in accordance with an embodiment of the present invention. The switching converter 100A is an LLC resonant converter. The primary circuit 10A includes transistors M1, M2, inductors Ls, Lm and a capacitor Cs, wherein the inductor Lm is generally formed by magnetizing inductance of the transformer T. The rectifying circuit 20A includes diodes D1 and D2, connected as shown in the figure. The zero current detecting circuit 40A includes a resistor R1 and a comparator COM6. The resistor R1 is serially connected to the photo-sensitive device to form a common node. The comparator COM6 has a non-inverting input terminal, an inverting input terminal and an output terminal, wherein the non-inverting input terminal is configured to receive a threshold voltage Vth6, the inverting input terminal is coupled to the common node of the resistor R1 and the photo-sensitive device. The comparator COM6 compares the voltage Vbst at the common node with the threshold voltage Vth6, and generates the zero current detection signal ZCD at the output terminal. Although the photo-sensitive device is coupled between the resistor R1 and the primary reference ground in FIG. 6, people of ordinary skill in the art could recognize that, location of the photo-sensitive device can be swapped with the resistor R1 in certain applications.

In the embodiment of FIG. 6, the current Iset flowing through the transistor M3 is utilized to adjust the switching frequency of the primary circuit 10A. A resistor R5 coupled to the resistor R1 and the photo-sensitive device in parallel is further incorporated to set a minimum value of the switching frequency.

The primary control circuit 30A includes a logic driving circuit 301 and a frequency modulating circuit 302. The frequency modulating circuit 302 receives the current Iset and generates a frequency modulation signal PFM based thereupon. The frequency modulation signal PFM is typically a pulse signal with its frequency varying with the current Iset, and its duty cycle fixed to 50%. The logic driving circuit 301 is coupled to the zero current detecting circuit 40A and the frequency modulating circuit 302. Based on the zero current detection signal ZCD and the frequency modulation signal PFM, the logic driving circuit 301 generates control signals CTRL1 and CTRL2 to respectively control the transistors M1 and M2.

If the voltage Vbst is higher than the threshold voltage Vth6 (e.g. 1.95V), the zero current detecting circuit 40A will determine the current flowing through the photo-sensitive device is zero. The logic driving circuit 301 will thus turn off the transistors M1 and M2 to stop the energy provided to the secondary side. On the other hand, if the voltage Vbst is lower than the threshold voltage Vth6, the logic driving circuit 301 will control the transistors M1 and M2 in accordance with the frequency modulation signal PFM, so the output voltage Vout can be regulated.

Figure 7:
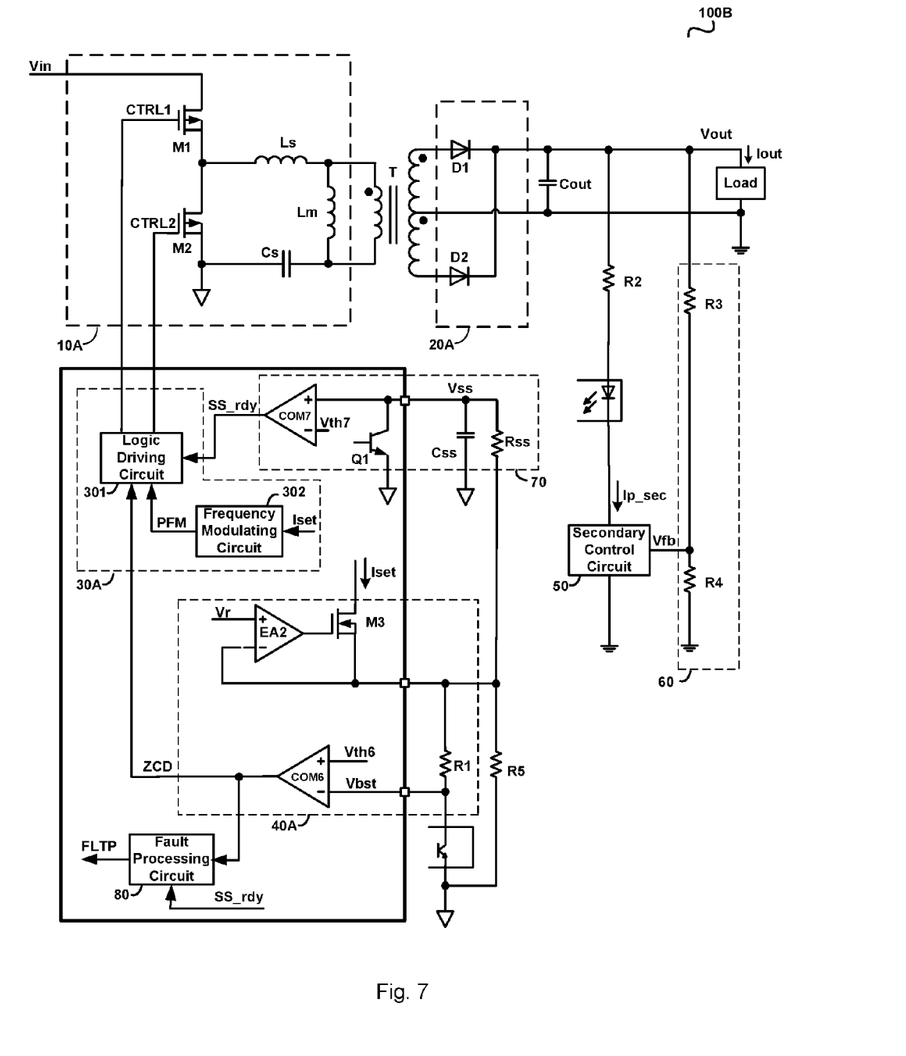

FIG. 7 is a block diagram of isolated switching converter 100B in accordance with an embodiment of the present invention. Compared with the circuit of FIG. 6, the switching converter 100B further comprises a soft start circuit 70 and a fault processing circuit 80. The soft start circuit 70 which is configured to realize soft start of the switching converter 100B includes a transistor Q1, a capacitor Css and a resistor Rss.

The fault processing circuit 80 has an input terminal and an output terminal, wherein the input terminal is coupled to the output terminal of the zero current detecting circuit 40A, the output terminal is configured to provide a fault processing signal FLTP. Based on the zero current detection signal ZCD, the fault processing circuit 80 measures the time during which the current flowing through the photo-sensitive device is continuously zero, and determines that the switching converter is in a fault condition if the measured time reaches a predetermined time threshold. In some embodiments, the transistor Q1 is turned on to reset the soft start circuit 70 when a fault condition has been detected. Besides, the transistor Q1 maintains off in the burst mode.

Generally, the primary control circuit 30A and the fault processing circuit 80 should not respond to the zero current detection signal ZCD until the soft start of the switching converter is over. Therefore, in the embodiment of FIG. 7, the soft start circuit 70 further comprises a comparator COM7. This comparator COM7 compares the voltage Vss across the capacitor Css with a threshold voltage Vth7, and provides a signal SS_rdy indicating whether the soft start has been finished to the primary control circuit 30A and the fault processing circuit 80.

Figure 8:
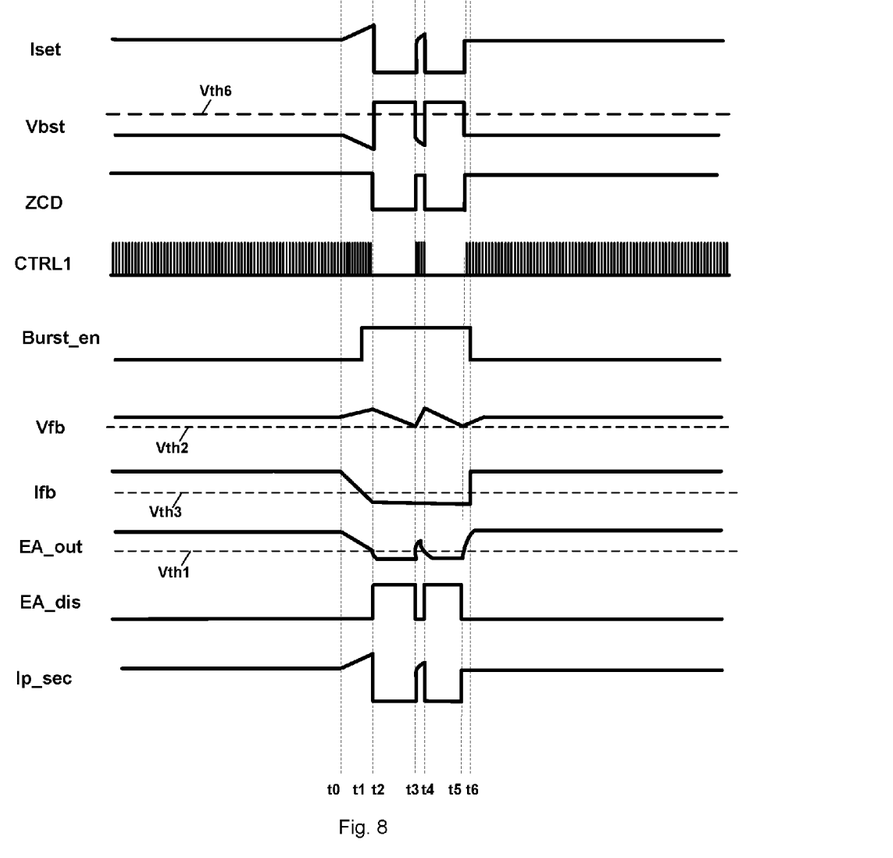
FIG. 8 illustrates working waveforms of the switching converter 100B shown in FIG. 7 in accordance with an embodiment of the present invention.

FIG. 8 illustrates working waveforms of the switching converter 100B in accordance with an embodiment of the present invention, where the secondary control circuit 50 utilizes the configuration shown in FIG. 5. As can be seen from FIG. 8, the switching converter works in normal operation ahead of t0. The current feedback signal Ifb is higher than the threshold voltage Vth3 and the comparison signal Burst_en is logical low. The switch control signal EA_dis keeps low, and the transistor S1 is continuously on to provide the error amplifying signal EA_out to the second terminal of the light emitting device. There are therefore current flowing through both the light emitting device and the photo-sensitive device. The voltage Vbst is lower than the threshold voltage Vth6, and the zero current detection signal ZCD maintains high. The transistors M1 and M2 keep switching at a switching frequency determined by the current Iset, so as to realize the regulation of the output voltage Vout.

At t0, the load current starts to decrease. The voltage feedback signal Vfb goes up while the current feedback signal Ifb and the error amplifying signal EA_out go down. When the current feedback signal Ifb decreases to reach the threshold voltage Vth3 at t1, the comparison signal Burst_en changes from logical low into logical high.

At t2, the error amplifying signal EA_out reduces to reach the threshold voltage Vth1. The flip-flop FF1 is set, and the switch control signal EA_dis changes from logical low into logical high to turn off the transistor S1. The current flowing through the light emitting device and the photo-sensitive device both become zero, which causes the voltage Vbst to be higher than the threshold voltage Vth6. The zero current detection signal ZCD changes from logical high into logical low and stops the transistors M1 and M2 from switching. The energy provided to the secondary side is thus ceased, and the voltage feedback signal Vfb starts to fall.

At t3, the voltage feedback signal Vfb declines to reach the threshold voltage Vth2 and the flip-flop FF1 is reset. The switch control signal EA_dis changes from logical high into logical low to turn on the transistor S1. The error amplifying signal EA_out is thus reconnected to the second terminal of the light emitting device, and the zero current detection signal ZCD changes from logical low into logical high. The transistors M1 and M2 resume their normal operation and get the voltage feedback signal Vfb to increase until the error amplifying signal EA_out decreases to reach the threshold voltage Vth1 again at t4. Afterwards, the actions during t2~t4 are repeated until the load current goes back to its normal value at t6.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A control method used in an isolated switching converter, wherein the switching converter includes a transformer with a primary winding and a secondary winding, a primary circuit coupled to the primary winding, a rectifying circuit coupled to the secondary winding, and an optocoupler with a photo-sensitive device and a light emitting device, and wherein the light emitting device has a first terminal coupled to an output voltage of the switching converter, the control method comprises:

sensing the output voltage and generating a voltage feedback signal;
generating an error amplifying signal based on a reference signal and the voltage feedback signal, and providing the error amplifying signal to a second terminal of the light emitting device;
comparing the error amplifying signal with a first threshold voltage;
disconnecting the error amplifying signal from the second terminal of the light emitting device if the error amplifying signal becomes lower than the first threshold voltage;
comparing the voltage feedback signal with a second threshold voltage; and
reconnecting the error amplifying signal to the second terminal of the light emitting device when the voltage reference signal becomes lower than the second threshold voltage.

2. The control method of claim 1, wherein switching frequency or duty cycle of transistors in the primary circuit is adjusted in accordance with the current flowing through the photo-sensitive device.

3. The control method of claim 1, wherein the primary circuit will stop providing energy to the rectifying circuit if the current flowing through the photo-sensitive device is detected to be zero.

4. The control method of claim 1, further comprising:
sensing an output current of the switching converter and generating a current feedback signal; and
comparing the current feedback signal with a third threshold voltage; wherein
the error amplifying signal could be disconnected from the second terminal of the light emitting device only if the current feedback signal is lower than the third threshold voltage.

5. The control method of claim 1, further comprising:
comparing the voltage feedback signal with a fourth threshold voltage; and
disconnecting the error amplifying signal from the second terminal of the light emitting device if the voltage feedback signal becomes higher than the fourth threshold voltage.

6. The control method of claim 1, further comprising:
sensing an output current of the switching converter and generating a current feedback signal;
comparing the current feedback signal with a fifth threshold voltage; and
disconnecting the error amplifying signal from the second terminal of the light emitting device if the current feedback signal becomes higher than the fifth threshold voltage.

7. A secondary control circuit used in an isolated converter, wherein the switching converter includes a transformer with a primary winding and a secondary winding, a primary circuit coupled to the primary winding, a rectifying circuit coupled to the secondary winding, and an optocoupler with a photo-sensitive device and a light emitting device, and wherein the light emitting device has a first terminal coupled to an output voltage of the switching converter, the secondary control circuit comprises:
an error amplifier having a first input terminal, a second input terminal and an output terminal, wherein the first input terminal is configured to receive a reference signal, the second input terminal is configured to receive a voltage feedback signal indicative of the output voltage, and wherein based on the reference signal and the voltage feedback signal, the error amplifier generates an error amplifying signal at the output terminal;

a transistor having a first terminal, a second terminal and a control terminal, wherein the first terminal is coupled to a second terminal of the light emitting device, the second terminal is coupled to the output terminal of the error amplifier;

a first comparator having a first input terminal, a second input terminal and an output terminal, wherein the first input terminal is configured to receive a first threshold voltage, the second input terminal is coupled to the output terminal of the error amplifier, and wherein the first comparator compares the error amplifying signal with the first threshold voltage and generates a first comparison signal at the output terminal;

a second comparator having a first input terminal, a second input terminal and an output terminal, wherein the first input terminal is configured to receive a second threshold voltage, the second input terminal is configured to receive the voltage feedback signal, and wherein the second comparator compares the voltage feedback signal with the second threshold voltage and generates a second comparison signal at the output terminal; and a logic circuit having a first input terminal, a second input terminal and an output terminal, wherein the first input terminal is coupled to the output terminal of the first comparator, the second input terminal is coupled to the output terminal of the second comparator, the output terminal is coupled to the control terminal of the transistor, and wherein based on the first and second comparison signals, the logic circuit generates a switch control signal at the output terminal.

8. The secondary control circuit of claim 7, further comprising:

a third comparator having a first input terminal, a second input terminal and an output terminal, wherein the first input terminal is configured to receive a third threshold voltage, the second input terminal is configured to receive a current feedback signal indicative of an output current of the switching converter, and wherein the third comparator compares the current feedback signal with the third threshold voltage and generates a third comparison signal at the output terminal; and a first gate circuit having first input terminal, a second input terminal and an output terminal, wherein the first input terminal is coupled to the output terminal of the first comparator, the second input terminal is the output terminal of the third comparator, and the output terminal is coupled to the first input terminal of the logic circuit.

9. The secondary control circuit of claim 7, further comprising:

a fourth comparator having a first input terminal, a second input terminal and an output terminal, wherein the first input terminal is configured to receive the voltage feedback signal, the second input terminal is configured to receive a fourth threshold voltage, and wherein the fourth comparator compares the voltage feedback signal with the fourth threshold voltage and generates an over voltage protection signal at the output terminal; and a second gate circuit having first input terminal, a second input terminal and an output terminal, wherein the first input terminal is coupled to the output terminal of the first comparator, the second input terminal is coupled to the output terminal of the fourth comparator, and the output terminal is coupled to the first input terminal of the logic circuit.

10. The secondary control circuit of claim 9, wherein the second gate circuit further has a third input terminal, and the secondary control circuit further comprises:

a fifth comparator having a first input terminal, a second input terminal and an output terminal, wherein the first input terminal is configured to receive a current feedback signal indicative of an output current of the switching converter, the second input terminal is configured to receive a fifth threshold voltage, and wherein the fifth comparator compares the current feedback signal with the fifth threshold voltage and generates an over current protection signal at the output terminal;

a timer having an input terminal and an output terminal, wherein the input terminal is coupled to the output terminal of the fifth comparator, and wherein the timer measures time based on the over current protection signal and generate a timing signal at the output terminal; and a third gate circuit having first input terminal, a second input terminal and an output terminal, wherein the first input terminal is coupled to the output terminal of the second comparator, the second input terminal is coupled to the output terminal of the timer, and the output terminal is coupled to the second input terminal of the logic circuit.

* * * * *